US012682255B2

(12) United States Patent
Sato

(10) Patent No.: US 12,682,255 B2
(45) Date of Patent: Jul. 14, 2026

(54) LEARNING APPARATUS, TRAINED MODEL GENERATION METHOD, CLASSIFICATION APPARATUS, CLASSIFICATION METHOD, AND COMPUTER-READABLE RECORDING MEDIUM

(71) Applicant: NEC Corporation, Tokyo (JP)

(72) Inventor: Atsushi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 835 days.

(21) Appl. No.: 17/918,958

(22) PCT Filed: Apr. 21, 2020

(86) PCT No.: PCT/JP2020/017163
§ 371 (c)(1),
(2) Date: Oct. 14, 2022

(87) PCT Pub. No.: WO2021/214861
PCT Pub. Date: Oct. 28, 2021

(65) Prior Publication Data
US 2023/0252313 A1 Aug. 10, 2023

(51) Int. Cl.
G06N 5/022 (2023.01)

(52) U.S. Cl.
CPC ................................... G06N 5/022 (2013.01)

(58) Field of Classification Search
CPC ...................................................... G06N 5/022
See application file for complete search history.

(56) References Cited

U.S. PATENT DOCUMENTS

2022/0019899 A1    1/2022   Murasaki et al.
2023/0119103 A1*   4/2023   Nishiyama ............. G06N 20/00
                                                         706/12

FOREIGN PATENT DOCUMENTS

JP         2017-102540 A      6/2017
JP         2020-095411 A      6/2020

OTHER PUBLICATIONS

Iwata, T., Fujino, A., & Ueda, N. (2020, April). Semi-supervised learning for maximizing the partial AUC. In Proceedings of the AAAI Conference on Artificial Intelligence (vol. 34, No. 04, pp. 4239-4246). (Year: 2020).*

(Continued)

*Primary Examiner* — Kenneth M Lo
(74) *Attorney, Agent, or Firm* — Sughrue Mion, PLLC

(57) ABSTRACT
The learning apparatus for machine learning a score function to be used for two-class classification includes a score function optimization unit that updates, by setting, as an index, a total value of a value obtained by multiplying an AUC by a weight λ which is a positive real number and a value obtained by multiplying a pAUC by a weight (1−λ), a parameter of the score function through machine learning that is performed, using training data, so as to maximize the index, while decreasing the value of the weight λ. The AUC indicates an area of a region on a horizontal axis side of a curve obtained by changing a threshold for determining a positive example and a negative example in the score function. The pAUC is a value of the AUC when the value of the false positive rate is set to a specific fixed value.

6 Claims, 8 Drawing Sheets

(56) References Cited

OTHER PUBLICATIONS

Yu, W., Ivan Chang, Y. C., & Park, E. (2014). A modified area under the ROC curve and its application to marker selection and classification. Journal of the Korean Statistical Society, 43(2), 161-175. (Year: 2014).*

International Search Report for PCT Application No. PCT/JP2020/017163, mailed on Jul. 14, 2020.

H. Narasimhan and S. Agarwal, "A Structural SVM Based Approach for Optimizing Partial AUC", Int'l Conf. on Machine Learning (ICML), 2013.

English translation of Written opinion for PCT Application No. PCT/JP2020/017163, mailed on Jul. 14, 2020.

* cited by examiner

PRIOR ART

EXAMPLE EMBODIMENT $s_i^+ > s_j^-$ : LEARNING TARGET $s_i^+ > s_j^-$ : NON-LEARNING TARGET

LEARNING APPARATUS, TRAINED MODEL GENERATION METHOD, CLASSIFICATION APPARATUS, CLASSIFICATION METHOD, AND COMPUTER-READABLE RECORDING MEDIUM

This application is a National Stage Entry of PCT/JP2020/017163 filed on Apr. 21, 2020, the contents of all of which are incorporated herein by reference, in their entirety.

TECHNICAL FIELD

The invention relates to a learning apparatus and a trained model generation method for machine learning a parameter of a score function to be used for two-class classification, further relates to a classification apparatus and a classification method for performing two-class classification, and further relates to a computer-readable recording medium having recorded thereon a program for achieving the apparatuses and methods.

BACKGROUND ART

In recent years, two-class classification for determining whether observation data is a positive example class or a negative example class has been performed. In two-class classification, a parameter of a score function for outputting a score are subjected to machine learning in accordance with observation data, and a trained model for performing two-class classification is generated. Two-class classification is used in, for example, video monitoring, failure diagnosis, inspection, medical image diagnosis, and the like, which are performed using image data.

However, in two-class classification, a situation in which the number of pieces of training data in the positive example class is extremely small compared to the number of pieces of training data in the negative example class easily occurs, and in this case, sufficient classification accuracy may not be ensured. In order to solve this problem, for example, Non-Patent Document 1 discloses a learning method for leaning a parameter of a score function so as to increase a partial AUC (hereinafter, referred to as "pAUC"). According to this learning method, data that are difficult to classify is particularly extracted from negative examples to perform parameter leaning, and thus it is considered that the above-described problem is solved.

Here, an AUC (Area Under the Curve) and a pAUC will be described with reference to FIG. 8. FIG. 8 is a diagram for explaining an AUC and a pAUC. FIG. 8 illustrates ROC (Receiver Operating Characteristic) curves. An ROC curve is a curve obtained by plotting a true positive rate (vertical axis) and a false positive rate (horizontal axis) while changing a threshold for determining a positive example and a negative example in the score function. Also, the true positive rate indicates a correct detection rate, and the false positive rate indicates a false detection rate.

As illustrated in the upper diagram of FIG. 8, the AUC indicates the area of the region on the horizontal axis side (lower side) of the ROC (Receiver Operating Characteristic) curve. In addition, as illustrated in the lower diagram of FIG. 8, the pAUC is a value of the AUC when a value of a false positive rate is a certain fixed value 3, and indicates an area of a region enclosed by the ROC curve, the horizontal axis, and the vertical axis that passes through the fixed value 3.

Patent Document 1 also discloses a method for learning a parameter of a score function in a case where the number of pieces of training data in a positive example class is extremely smaller than the number of pieces of training data in a negative example class. In the method disclosed in Patent Document 1, the above-described problem is solved by employing, as a score function, a ratio between a probability model of a positive example class and a learning model of a negative example class.

LIST OF RELATED ART DOCUMENTS

Patent Document

Patent Document 1: Japanese Patent Laid-Open Publication No. 2017-102540

Non-Patent Document

Non-Patent Document 1: H. Narasimhan and S. Agarwal, "A Structural SVM Based Approach for Optimizing Partial AUC", Int'l Conf. on Machine Learning (ICML), 2013.

DISCLOSURE OF THE INVENTION

Problems to be Solved by the Invention

However, in the learning method disclosed in Non-Patent Document 1, in the above-described case where the number of pieces of training data in a positive example class is extremely small, there is a problem in that a parameter of the score function excessively adapt to the training data, and overlearning in which accuracy with respect to observation data is reduced is likely to occur. Here, overlearning refers to a state in which optimization is performed only on training data and versatility is lost.

In contrast, in the learning method disclosed in Patent Document 1, it is considered that overlearning is less likely to occur compared to the learning method disclosed in Non-Patent Document 1, however, because two probability models are required, a nonlinear model such as a deep network cannot be used, and as a result, there is a limit in improving classification accuracy.

An example object of the invention is to solve the above-described issues, and to provide a learning apparatus, a classification apparatus, a trained model generation method, a classification method, and a computer-readable recording medium capable of suppressing overlearning and improving classification accuracy in two-class classification in a case where the number of pieces of data in a positive example class is smaller than the number of pieces of data in a negative example class.

Means for Solving the Problems

In order to achieve the above-described object, a learning apparatus for machine learning a score function to be used for two-class classification, includes:

a score function optimization unit that updates, by setting, as an index, a total value of a value obtained by multiplying an AUC by a weight $\lambda$ which is a positive real number and a value obtained by multiplying a pAUC by a weight $(1-\lambda)$, a parameter of the score function through machine learning that is performed, using training data, so as to maximize the index, while decreasing the value of the weight $\lambda$, wherein the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

In addition, in order to achieve the above-described object, a trained model generation method for machine learning a score function to be used for two-class classification, includes:

a score function optimization step of updating, by setting, as an index, a total value of a value obtained by multiplying an AUC by a weight $\lambda$ which is a positive real number and a value obtained by multiplying a pAUC by a weight $(1-\lambda)$, a parameter of the score function through machine learning that is performed, using training data, so as to maximize the index, while decreasing the value of the weight $\lambda$, wherein the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

Furthermore, in order to achieve the above-described object, a first computer readable recording medium according to an example aspect of the invention is a computer readable recording medium that includes recorded thereon a program, the program including instructions that cause the computer to carry out by setting, as an index, a total value of a value obtained by multiplying an AUC by a weight $\lambda$ which is a positive real number and a value obtained by multiplying a pAUC by a weight $(1-\lambda)$, updating a parameter of the score function through machine learning that is performed, using training data, so as to maximize the index, while decreasing the value of the weight $\lambda$, wherein the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

Furthermore, in order to achieve the above-described object, a classification apparatus, includes:

a score calculation unit that calculates a score by inputting test data to a score function; and a classification unit that classifies the test data into two classes, based on the value of the calculated score, wherein the score function is a function in which a parameter thereof is updated, by setting, as an index, a total value of a value obtained by multiplying an AUC by a weight $\lambda$ which is a positive real number and a value obtained by multiplying a pAUC by a weight $(1-\lambda)$, and performing machine learning that uses training data, so as to maximize the index, while decreasing the value of the weight $\lambda$, the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

Furthermore, in order to achieve the above-described object, a classification method includes:

a score calculation step of calculating a score by inputting test data to a score function; and a classification step of classifying the test data into two classes, based on the value of the calculated score, wherein the score function is a function in which a parameter thereof is updated, by setting, as an index, a total value of a value obtained by multiplying an AUC by a weight $\lambda$ which is a positive real number and a value obtained by multiplying a pAUC by a weight $(1-\lambda)$, and performing machine learning that uses training data, so as to maximize the index, while decreasing the value of the weight $\lambda$, the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

Furthermore, in order to achieve the above-described object, a second computer readable recording medium according to an example aspect of the invention is a computer readable recording medium that includes recorded thereon a program, the program including instructions that cause the computer to carry out a score calculation step of calculating a score by inputting test data to a score function; and a classification step of classifying the test data into two classes, based on the value of the calculated score, wherein the score function is a function in which a parameter thereof is updated, by setting, as an index, a total value of a value obtained by multiplying an AUC by a weight $\lambda$ which is a positive real number and a value obtained by multiplying a pAUC by a weight $(1-\lambda)$, and performing machine learning that uses training data, so as to maximize the index, while decreasing the value of the weight $\lambda$, the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

Advantageous Effects of the Invention

As described above, according to the invention, it is possible to suppress overlearning and improve classification accuracy in two-class classification in a case where the number of pieces of data in a positive example class is smaller than the number of pieces of data in a negative example class.

EXAMPLE EMBODIMENTS

First Example Embodiment

Hereinafter, a learning apparatus, a trained model generation method, and a program according to a first example embodiment will be described with reference to FIGS. 1 to 4.

[Apparatus Configuration]

Figure 1:
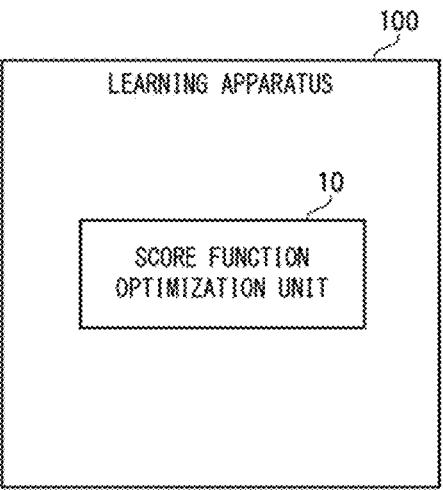
FIG. 1 is a configuration diagram illustrating a schematic configuration of the learning apparatus according to the first example embodiment.

First, a schematic configuration of a learning apparatus according to the first example embodiment will be described with reference to FIG. 1. FIG. 1 is a configuration diagram illustrating a schematic configuration of the learning apparatus according to the first example embodiment.

A learning apparatus 100 according to the first example embodiment illustrated in FIG. 1 is an apparatus for machine learning a score function to be used for two-class classification. As illustrated in FIG. 1, the learning apparatus 100 according to the first example embodiment includes a score function optimization unit 10.

The score function optimization unit 10 sets, as an index, a total value of a value obtained by multiplying AUC by a weight λ which is a positive real number and a value obtained by multiplying pAUC by a weight (1−λ), and updates a parameter of a score function through machine learning using training data, so as to maximize the index, while decreasing the value of the weight λ.

Here, as described in the background art section, the AUC represents the area of region on the horizontal axis side of a curve obtained by changing a threshold for determining a positive example and a negative example in a score function and setting the vertical axis as a true positive rate and the horizontal axis as a false positive rate. Also, the pAUC is a value of the AUC when the value of the false positive rate is set to a specific fixed value, and indicates the area of a region surrounded by the above curve, the horizontal axis, and the vertical axis that passes through the fixed value.

As described above, in the first example embodiment, the machine learning of the parameter of the score function is performed using not only the pAUC but also the AUC as an index, and thus overlearning in a case of using only the pAUC is suppressed. In addition, in the first example embodiment, given that two probability models are not required, and a nonlinear model such as a deep network can also be learned, the classification accuracy can also be improved. According to the first example embodiment, in two-class classification in the case where the number of pieces of data in a positive example class is smaller than the number of pieces of data in a negative example class, it is possible to suppress overlearning and improve the classification accuracy.

Figure 2:
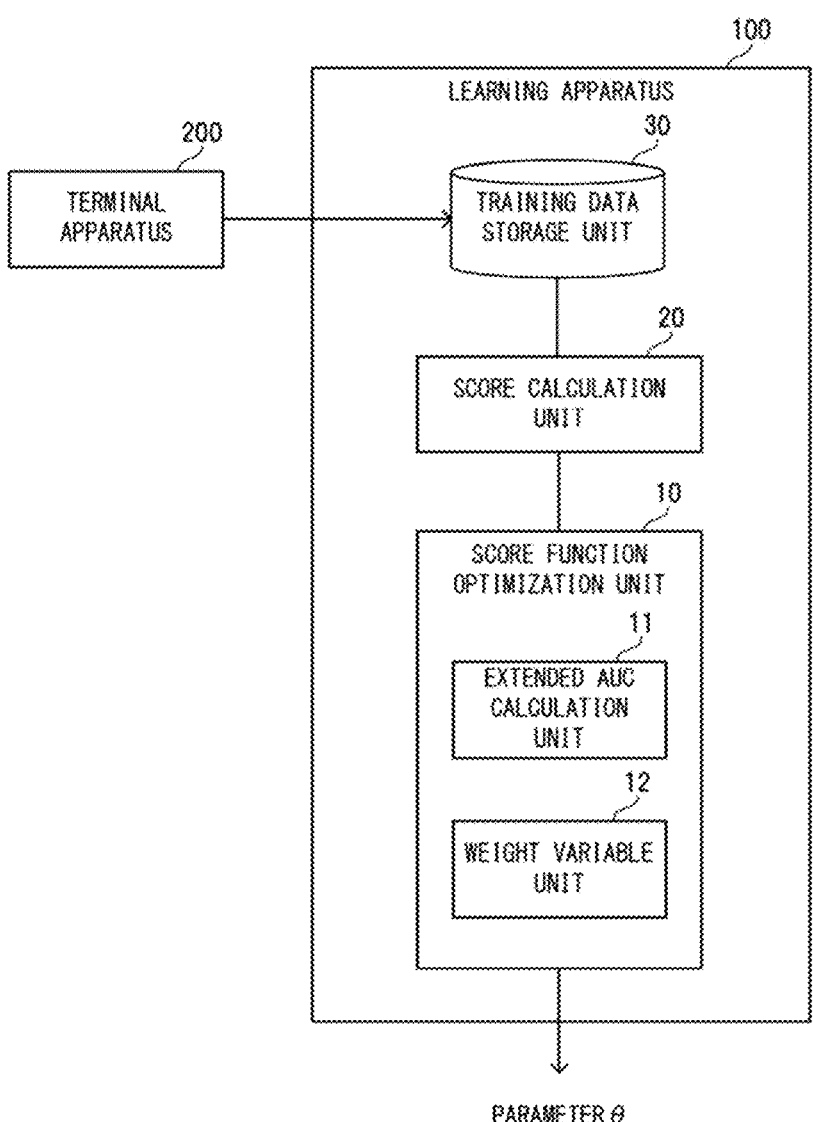
FIG. 2 is a configuration diagram specifically illustrating the configuration of the learning apparatus according to the first example embodiment.

Next, the configuration and functions of the learning apparatus 100 according to the first example embodiment will be specifically described with reference to FIG. 2. FIG. 2 is a configuration diagram specifically illustrating the configuration of the learning apparatus according to the first example embodiment.

As illustrated in FIG. 2, in the first example embodiment, the learning apparatus 100 is connected to a terminal apparatus 200 to which training data is input so as to be capable of data communication. Specific examples of the terminal apparatus 200 include a general-purpose computer, a smartphone, and a tablet-type terminal device.

Also, as illustrated in FIG. 2, in the first example embodiment, the learning apparatus 100 includes a score calculation unit 20 and a training data storage unit 30, in addition to the score function optimization unit 10 described above.

The training data storage unit 30 stores training data transmitted from the terminal apparatus 200. The training data includes positive examples and negative examples. The score calculation unit 20 inputs the training data stored in the training data storage unit 30 to the score function, and calculates a score for each piece of the training data.

In the first example embodiment, the score function optimization unit 10 includes an extended AUC calculation unit 11 and a weight variable unit 12. The extended AUC calculation unit 11 calculates, as an index eAUC, a total value of a value obtained by multiplying the AUC by a weight λ and a value obtained by multiplying the pAUC by a weight (1−λ). Here, when the score function is represented by f(x;θ) and a parameter thereof is θ, the index eAUC (θ,λ) is calculated by the following Equation 1.

$$\mathrm{eAUC}(\theta,\lambda){=}\lambda{\times}\mathrm{AUC}{+}(1{-}\lambda){\times}\mathrm{pAUC} \qquad \text{Equation 1}$$

Specifically, the above Equation 1 can be rewritten as the following Equations 2 and 3. In Equation 2, 1*( ) is a differentiable 0-1 function. A sigmoid function or any monotonically increasing function is used as I*( ), for example. In addition, $x_i^+$ represents training data of a positive example, $x_j^-$ represents training data of a negative example, $N^+$ represents the number of pieces of training data of the positive example, and $N^-$ represents the number of pieces of training data of the negative example. Z represents a set of training data of the negative example that will be a false positive with respect to a false positive rate β that has been set in advance.

Equation 2

$$eAUC(\theta, \lambda) = \frac{\lambda}{N^+ N^-} \sum_{i=1}^{N^+} \sum_{j=1}^{N^-} I * \left( f(x_i^+; \theta) - f(x_j^-; \theta) \right) w_j$$

$$w_j = \begin{cases} 1 & x_j^- \in Z \\ \lambda & x_j^- \notin Z \end{cases}$$

$$\hat{\theta} = \underset{\theta}{\operatorname{argmax}} \; eAUC(\theta, \lambda) \qquad \text{Equation 3}$$

The score function optimization unit 10 selects, from the score values calculated by the score calculation unit 20, the set Z of training data of the negative example that will be a false positive with respect to the false positive rate β that has been set in advance. Next, the score function optimization unit 10 sets $w_j$ to 1 for the training data $x_j$ of the negative example included in the set Z, and sets $w_j$ to λ for the training data $x_j$ of the negative example that is not included in the set Z, and then causes the extended AUC calculation unit 11 to calculate the index eAUC(θ,λ) based on the above Equation 2. The score function optimization unit 10 then calculates the parameter θ that maximizes the index eAUC (θ,λ) using the above Equation 3 and updates the parameter θ, while causing the weight variable unit 12 to decrease the value of the weight λ.

[Operation of Apparatus]

Figure 3:
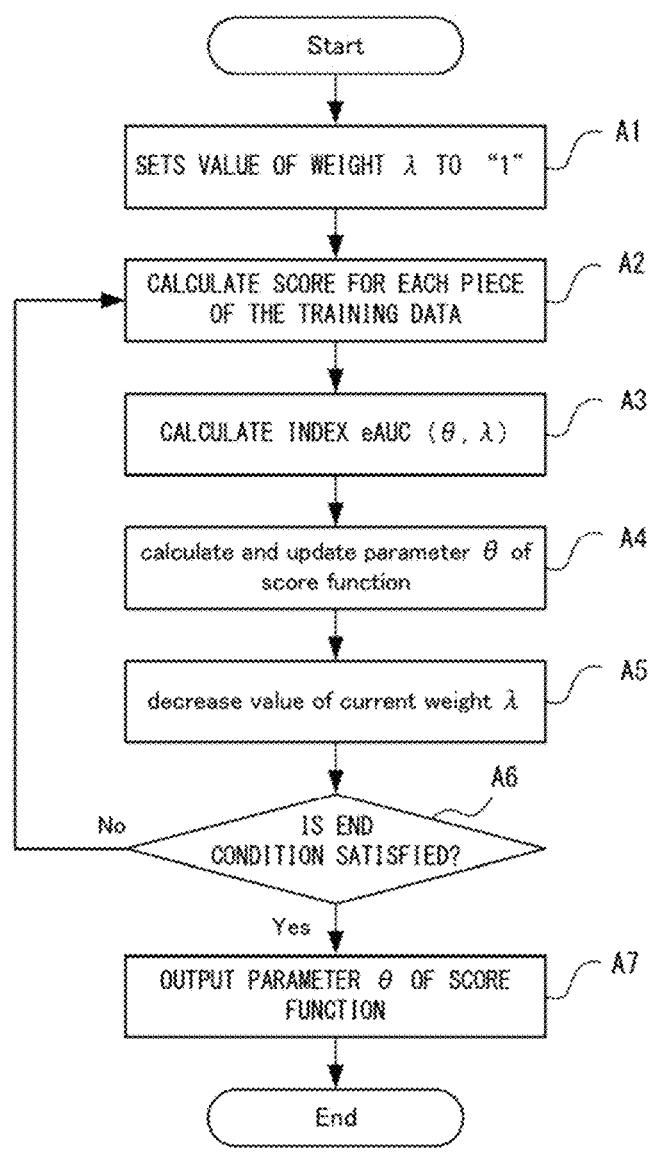
FIG. 3 is a flowchart illustrating the operation of the learning apparatus according to the first example embodiment.

Next, an operation of the learning apparatus 100 according to the first example embodiment will be described with reference to FIG. 3. FIG. 3 is a flowchart illustrating the operation of the learning apparatus according to the first example embodiment. In the following description, FIGS. 1 and 2 will be referred to as appropriate. In addition, in the first example embodiment, a trained model generation method is performed by operating the learning apparatus 100. Accordingly, the following description of the operation of the learning apparatus 100 applies to the description of the trained model generation method in the first example embodiment.

As illustrated in FIG. 3, the score function optimization unit 10 first sets the value of the weight λ to "1", which is an initial value (step A1). Next, the score calculation unit 20 obtains training data stored in advance from the training data storage unit 30, and calculates a score using the score function for each piece of the training data (step A2).

Next, the score function optimization unit 10 causes the extended AUC calculation unit 11 to calculate the index eAUC (θ,λ) using Equation 2 described above (step A3).

Specifically, in step A3, the score function optimization unit 10 selects, from the score values calculated in step A2, the set Z of training data of the negative example that will be a false positive with respect to the false positive rate β that has been set in advance. Next, the score function optimization unit 10 sets $w_j$ to 1 for the training data $x_j$ of the negative example included in the set Z and sets $w_j$ to λ for the training data $x_j$ of the negative example that is not included in the set Z, and then causes the extended AUC calculation unit 11 to calculate the index eAUC(θ,λ) using the above Equation 2.

Then, the score function optimization unit 10 calculates the parameter θ that maximizes the index eAUC(θ,λ) calculated in step A3 using the above Equation 3, and updates the parameter θ (step A4).

Specifically, the score function optimization unit 10 searches for a neighborhood in which the value of the index eAUC(θ,λ), which is an objective function, is maximized in the neighborhood of the current parameter θ through a general hill-climbing method. In other words, the score function optimization unit 10 adds a minute value Δθ to the current parameter θ, specifies Δθ that maximizes the value of the index eAUC(θ,λ), and then sets 0+Δθ as the new parameter θ.

Next, the weight variable unit 12 sets a value obtained by decreasing the value of the current weight λ by a fixed value as a new weight λ (step A5).

Next, the score function optimization unit 10 determines whether or not an end condition is satisfied (step A6). An example of the end condition of step A6 is that the value of the weight λ is a value close to zero (threshold) or lower.

If a result of the determination in step A6 indicates that the end condition is not satisfied, the process returns to step A2 using the updated parameter θ and weight λ.

On the other hand, if the determination in step A6 indicates that the end condition is satisfied, the score function optimization unit 10 outputs the calculated parameter θ of the score function (step A7).

[Effects of First Example Embodiment]

Figure 4:
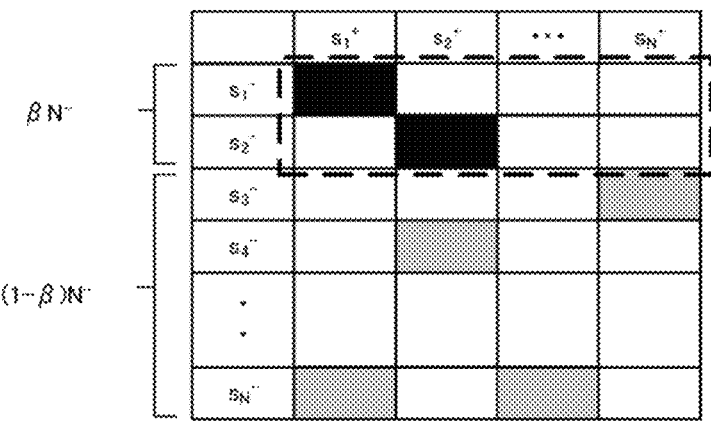
FIG. 4 is a diagram illustrating an example of training data to be learned in the related art and an example training data to be learned in the first example embodiment.

Effects of the first example embodiment will be described with reference to FIG. 4. FIG. 4 is a diagram illustrating an example of scores of training data to be learned in the related art and an example of scores of training data to be learned in the first example embodiment. Here, $s_i^+$ are scores of the training data $x_i^+$ of positive examples, and are obtained as $s_i^+ = f(x_i^+; \theta)$. On the other hand, $s_j^-$ are scores of the training data $x_j^-$ of negative examples, and are obtained as $s_j^- = f(x_j^-; \theta)$. Note that the negative examples are sorted in descending order of score.

In the related art, because the pAUC is used as an index, pairs of $\beta N^-$ negative examples and $N^+$ positive examples that are false positives, that is to say, $\beta N^- \times N^+$ pairs are learning targets, and the parameter θ of the score function is updated so that the number of pairs that satisfy $s_i^+ > s_j^-$ increases.

In the first example embodiment, because the value of the weight λ is set to 1 in the initial stage of learning, the AUC serves as an index. That is to say, the parameter θ of the score function is updated so that all pairs of $N^- \times N^+$ positive examples and negative examples are learning targets and the number of pairs that satisfy $s_i^+ > s_j^-$ increases. Then, because the value of the weight λ approaches zero as the learning progresses, the influence of the AUC on the object function is gradually reduced, and the eAUC approaches the pAUC, which is an index of the related art. Here, $\beta N^-$ negative examples having higher scores with respect to the preset false positive rate β are the set Z of training data of negative examples that are false positives.

However, because the learning ends before λ becomes zero, the learning target is not limited to $\beta N^- \times N^+$ pairs as in the related art, and all the pairs of $N^- \times N^+$ positive examples and negative examples are learning targets. In other words, in the related art, overlearning occurs because the number of pairs to be learned is small, but in the first example embodiment, overlearning is suppressed because all pairs are to be learned. In addition, in the first example embodiment, two probability models are not required, and thus a nonlinear model such as a deep network can be used, and the classification accuracy can be improved.

[Program]

It suffices for a program in the first example embodiment to be a program that causes a computer to carry out steps A1 to A7 illustrated in FIG. 3. Also, by this program being installed and executed in the computer, the learning apparatus 100 and the trained model generation method according to the first example embodiment can be realized. In this case, a processor of the computer functions and performs processing as the score function optimization unit 10 and the score calculation unit 20.

Further, in the first example embodiment, the training data storage unit 30 may be realized by storing data files constituting this in a storage device such as a hard disk provided in the computer or may be implemented by a storage device in another computer. The computer includes general-purpose PC, smartphone and tablet-type terminal device.

Furthermore, the program according to the first example embodiment may be executed by a computer system constructed with a plurality of computers. In this case, for example, each computer may function as the score function optimization unit 10 or the score calculation unit 20.

Second Example Embodiment

Next, in the second example embodiment, a classification apparatus, a classification method, and a program for achieving the apparatus and method will be described with reference to FIGS. 5 and 6.

[Apparatus Configuration]

First, a configuration of a classification apparatus according to the second example embodiment will be described with reference to FIG. 5. FIG. 5 is a block diagram illustrating a configuration of the classification apparatus according to the second example embodiment.

Figure 5:
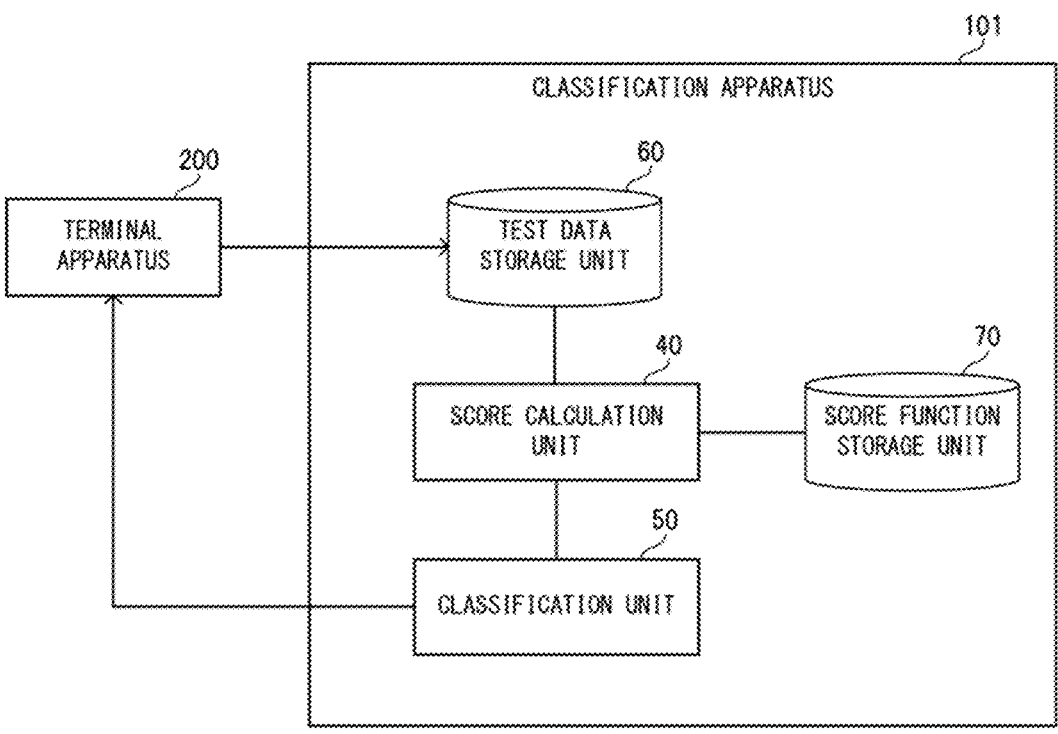
FIG. 5 is a block diagram illustrating a configuration of the classification apparatus according to the second example embodiment.

A classification apparatus 101 according to the second example embodiment illustrated in FIG. 5 is an apparatus for classifying test data into two classes using a score function. As illustrated in FIG. 5, in the second example embodiment, the classification apparatus 101 is connected to the terminal apparatus 200 so as to be capable of data communication, similarly to the first example embodiment. Specific examples of the terminal apparatus 200 include a general-purpose computer, a smartphone, and a tablet-type terminal device. However, in the second example embodiment, the terminal apparatus 200 inputs test data to be classified into two classes to the classification apparatus 101.

Also, as illustrated in FIG. 5, the classification apparatus 101 according to the second example embodiment includes a score calculation unit 40, a classification unit 50, a test data storage unit 60, and a score function storage unit 70. Of these units, the test data storage unit 60 stores the test data that has been input.

The score function storage unit 70 stores a score function to be used for two-class classification. The score function is a function in which a parameter thereof is updated, by setting, as an index, a total value of a value obtained by multiplying an AUC by a weight $\lambda$ which is a positive real number and a value obtained by multiplying a pAUC by a weight $(1-\lambda)$, and performing machine learning that uses training data, so as to maximize the index, while decreasing the value of the weight $\lambda$. Specifically, the score function that is used in the second example embodiment is the score function whose parameter has been updated in the first example embodiment.

The score calculation unit 40 obtains a score function from the score function storage unit 70, inputs test data extracted from the test data storage unit 60 to the obtained score function, and calculates a score. Here, the score calculation unit 40 in the second example embodiment has the same function as that of the score calculation unit 20 illustrated in FIG. 2 in the first example embodiment.

The classification unit 50 classifies the test data into two classes, such as positive examples and negative examples, for example, based on the value of the score calculated by the score calculation unit 40. In addition, the classification unit 50 can transmit the classification result to the terminal apparatus 200.

[Operation of Apparatus]

Next, an operation of the classification apparatus 101 according to the second example embodiment will be described with reference to FIG. 6. FIG. 6 is a flowchart illustrating the operation of the classification apparatus according to the second example embodiment. In the following description, FIG. 5 will be referred to as appropriate. Also, in the second example embodiment, a classification method is performed by operating the classification apparatus 101. Accordingly, the following description of the operation of the classification apparatus 101 applies to the description of the classification method in the second example embodiment.

Figure 6:
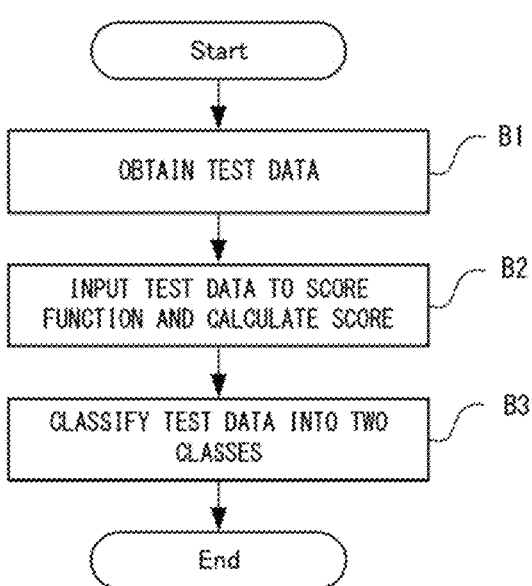
FIG. 6 is a flowchart illustrating the operation of the classification apparatus according to the second example embodiment.

As illustrated in FIG. 6, first, the score calculation unit 40 obtains test data from the test data storage unit 60 (step B1).

Next, the score calculation unit 40 obtains a score function from the score function storage unit 70, inputs the test data obtained in step B1 to the obtained score function, and calculates a score (step B2).

Then, the classification unit 50 classifies the test data into two classes, such as positive examples and negative examples, for example, based on the value of the score calculated in step B2 (step B3). In addition, the classification unit 50 transmits the classification result to the terminal apparatus 200.

As described above, according to the second example embodiment, the test data can be classified into two classes using the score function whose parameter has been updated in the first example embodiment. In this manner, high classification accuracy can be obtained.

[Program]

It suffices for a program in the second example embodiment to be a program that causes a computer to carry out steps B1 to B3 illustrated in FIG. 6. Also, by this program being installed and executed in the computer, the classification apparatus 101 and the classification method according to the second example embodiment can be realized. In this case, a processor of the computer functions and performs processing as the score calculation unit 40 and the classification unit 50.

Further, in the second example embodiment, the test data storage unit 60 and the score function storage unit 70 may be realized by storing data files constituting these in a storage device such as a hard disk provided in the computer or may be implemented by a storage device in another computer. The computer includes general-purpose PC, smartphone and tablet-type terminal device.

Furthermore, the program according to the second example embodiment may be executed by a computer system constructed with a plurality of computers. In this case, for example, each computer may function as the score calculation unit 40 or the classification unit 50.

[Physical Configuration]

Figure 7:
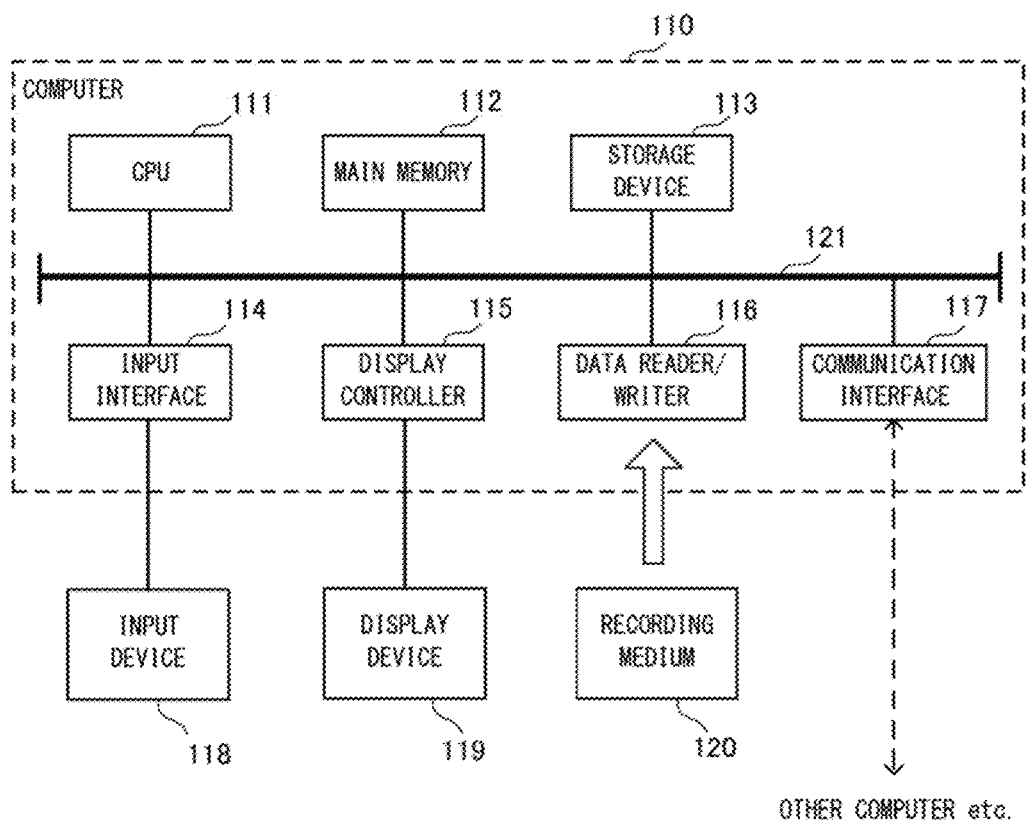
FIG. 7 is a block diagram illustrating an example of a computer that realizes the learning apparatus according to the first example embodiment and the classification apparatus according to the second example embodiment.
Figure 8:
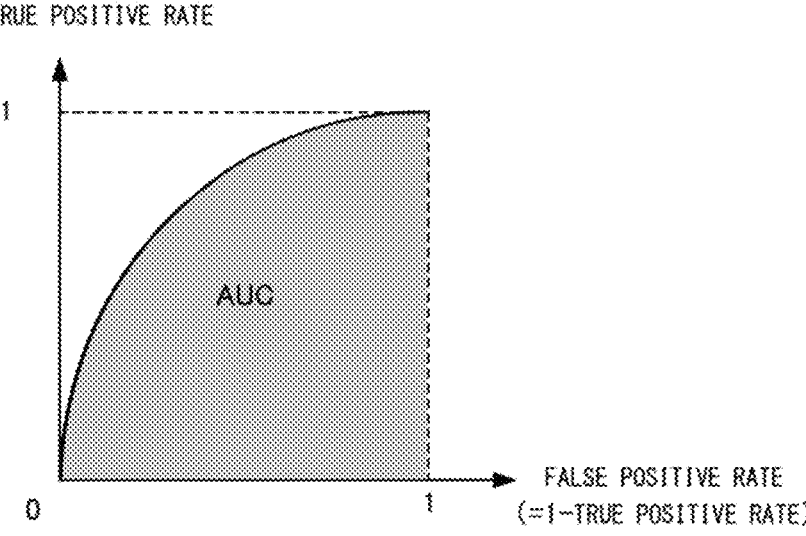
FIG. 8 is a diagram for explaining an AUC and a pAUC.
Figure 8:
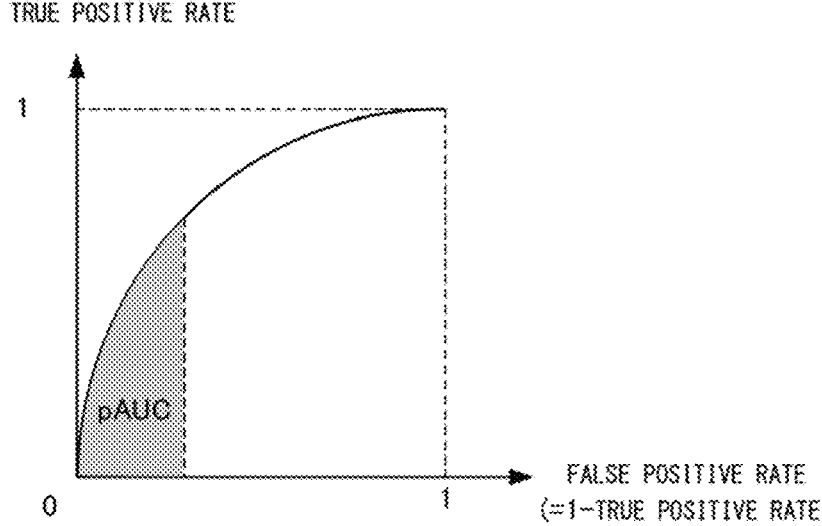

Using FIG. 7, the following describes a computer that realizes each apparatus by executing the program according to the first or second example embodiment. FIG. 7 is a block diagram illustrating an example of a computer that realizes the learning apparatus according to the first example embodiment and the classification apparatus according to the second example embodiment.

As shown in FIG. 7, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the programs according to the example embodiment.

The CPU 111 carries out various types of calculation by deploying the program (codes) according to the example embodiment, which is composed of codes and stored in the storage device 113, to the main memory 112, and executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the learning apparatus 100 according to the first example embodiment and the classification apparatus 101 according to the second example embodiment can also be realized by using items of hardware that respectively correspond to the components, rather than the computer in which the program is installed. Furthermore, the learning apparatus 100 according to the first example embodiment and the classification apparatus 101 according to the second example embodiment may be partly implemented by the program and the rest by hardware.

A part or an entirety of the above-described example embodiment can be represented by (Supplementary Note 1) to (Supplementary Note 9) described below, but is not limited to the description below.

(Supplementary Note 1)

A learning apparatus for machine learning a score function to be used for two-class classification, comprising:

a score function optimization unit that updates, by setting, as an index, a total value of a value obtained by multiplying an AUC by a weight λ which is a positive real number and a value obtained by multiplying a pAUC by a weight (1−λ), a parameter of the score function through machine learning that is performed, using training data, so as to maximize the index, while decreasing the value of the weight λ, wherein the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

(Supplementary Note 2)

The learning apparatus according to Supplementary Note 1, further comprising:

a score calculation unit that calculates a score for each piece of the training data by inputting the training data to the score function, wherein the score function optimization unit:

sets a weight for a pair with the training data of the positive example to 1, for the training data of the negative example which will be a false positive with respect to a false positive rate that has been set in advance, and sets a weight for a pair with the training data of the positive example to λ, for the training data of the negative example which will not be a false positive with respect to the false positive rate that has been set in advance, and updates the parameter of the score function, while decreasing the value of the weight λ.

(Supplementary Note 3)

A trained model generation method for machine learning a score function to be used for two-class classification, comprising:

a score function optimization step of updating, by setting, as an index, a total value of a value obtained by multiplying an AUC by a weight λ which is a positive real number and a value obtained by multiplying a pAUC by a weight (1−λ), a parameter of the score function through machine learning that is performed, using training data, so as to maximize the index, while decreasing the value of the weight λ, wherein the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

(Supplementary Note 4)

The trained model generation method according to Supplementary Note 3, further comprising:

a score calculation step of calculating a score for each piece of the training data by inputting the training data to the score function, wherein, in the score function optimization step, setting a weight for a pair with the training data of the positive example to 1, for the training data of the negative example which will be a false positive with respect to a false positive rate that has been set in advance, and setting a weight for a pair with the training data of the positive example to $\lambda$, for the training data of the negative example which will not be a false positive with respect to the false positive rate that has been set in advance, and updating the parameter of the score function, while decreasing the value of the weight $\lambda$.

(Supplementary Note 5)

A computer-readable recording medium that includes a program, recorded thereon, for machine learning a score function to be used for two-class classification, the program including instructions that cause a computer to carry out:

a score function optimization step of updating, by setting, as an index, a total value of a value obtained by multiplying an AUC by a weight $\lambda$ which is a positive real number and a value obtained by multiplying a pAUC by a weight $(1-\lambda)$, a parameter of the score function through machine learning that is performed, using training data, so as to maximize the index, while decreasing the value of the weight $\lambda$, wherein the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

(Supplementary Note 6)

The computer-readable recording medium according to Supplementary Note 5, wherein the program causes the computer to carry out:

a score calculation step of calculating a score for each piece of the training data by inputting the training data to the score function; and in the score function optimization step, setting a weight for a pair with the training data of the positive example to 1, for the training data of the negative example which will be a false positive with respect to a false positive rate that has been set in advance, and setting a weight for a pair with the training data of the positive example to $\lambda$, for the training data of the negative example which will not be a false positive with respect to the false positive rate that has been set in advance; and updating the parameter of the score function, while decreasing the value of the weight $\lambda$.

(Supplementary Note 7)

A classification apparatus, comprising:

a score calculation unit that calculates a score by inputting test data to a score function; and a classification unit that classifies the test data into two classes, based on the value of the calculated score, wherein the score function is a function in which a parameter thereof is updated, by setting, as an index, a total value of a value obtained by multiplying an AUC by a weight $\lambda$ which is a positive real number and a value obtained by multiplying a pAUC by a weight $(1-\lambda)$, and performing machine learning that uses training data, so as to maximize the index, while decreasing the value of the weight $\lambda$, the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

(Supplementary Note 8)

A classification method, comprising:

a score calculation step of calculating a score by inputting test data to a score function; and a classification step of classifying the test data into two classes, based on the value of the calculated score, wherein the score function is a function in which a parameter thereof is updated, by setting, as an index, a total value of a value obtained by multiplying an AUC by a weight $\lambda$ which is a positive real number and a value obtained by multiplying a pAUC by a weight $(1-\lambda)$, and performing machine learning that uses training data, so as to maximize the index, while decreasing the value of the weight $\lambda$, the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

(Supplementary Note 9)

9. A computer-readable recording medium that includes a program recorded thereon, the program including instructions that cause a computer to carry out:

a score calculation step of calculating a score by inputting test data to a score function; and a classification step of classifying the test data into two classes, based on the value of the calculated score, wherein the score function is a function in which a parameter thereof is updated, by setting, as an index, a total value of a value obtained by multiplying an AUC by a weight $\lambda$ which is a positive real number and a value obtained by multiplying a pAUC by a weight $(1-\lambda)$, and performing machine learning that uses training data, so as to maximize the index, while decreasing the value of the weight $\lambda$, the AUC indicates an area of a region on a horizontal axis side of a curve obtained by changing a threshold for determining a positive example and a negative example in the score function and setting a vertical axis as a true positive rate and a horizontal axis as a false positive rate, and the pAUC is a value of the AUC when the value of the false positive rate is set to a specific fixed value, and indicates an area of a region enclosed by the curve, the horizontal axis, and the vertical axis that passes through the fixed value.

Although the invention of the present application has been described above with reference to the example embodiment, the invention of the present application is not limited to the above-described example embodiment. Various changes that can be understood by a person skilled in the art within the scope of the invention of the present application can be made to the configuration and the details of the invention of the present application.

INDUSTRIAL APPLICABILITY

As described above, according to the present invention, it is possible to suppress overlearning and improve classification accuracy in two-class classification in a case where the number of pieces of data in a positive example class is smaller than the number of pieces of data in a negative example class. The present invention is useful in a variety of systems where two-class classification is performed.

REFERENCE SIGNS LIST

10 Score function optimization unit
11 Extended AUC calculation unit
12 Weight variable unit
20 Score calculation unit
30 Training data storage unit
40 Score calculation unit
50 Classification unit
60 Test data storage unit
70 Score function storage unit
100 Learning apparatus
101 Classification apparatus
110 Computer
111 CPU
112 Main memory
113 Storage device
114 Input interface
115 Display controller
116 Data reader/writer
117 Communication interface
118 Input device
119 Display device
120 Recording medium
121 Bus
200 Terminal apparatus

What is claimed is:

1. A learning apparatus for machine learning a score function to be used for two-class classification, the learning apparatus comprising:
at least one processor; and
at least one memory,
wherein the at least one processor is configured to execute:
a score calculation unit configured to calculate a score for each piece of training data by inputting the training data to the score function; and
a score function optimization unit configured to:
identify a set of negative example training data that will be a false positive with respect to a specific fixed value of a false positive rate, based on the calculated scores; and update a parameter of the score function through machine learning that is performed so as to maximize the index,
wherein the index is calculated by setting a weight for a pair of a positive example training data and a negative example training data to 1 when the negative example training data is within the identified set, and setting the weight for the pair to $\lambda$, which is a positive real number, when the negative example training data is not within the identified set,
wherein the update is performed while decreasing the value of the weight $\lambda$ over a course of the machine learning,
wherein the index thereby represents a total value of a value obtained by multiplying an AUC by the weight $\lambda$ and a value obtained by multiplying a pAUC by a weight $(1-\lambda)$,
wherein the AUC indicates an area of a region on a horizontal axis side of a curve obtained by changing a threshold for determining a positive example and a negative example in the score function and setting a vertical axis as a true positive rate and a horizontal axis as a false positive rate, and
wherein the pAUC is a value of the AUC when the value of the false positive rate is set to a specific fixed value, and indicates an area of a region enclosed by the curve, the horizontal axis, and the vertical axis that passes through the fixed value.

2. The learning apparatus according to claim 1, further comprising:
a score calculation unit configured to calculate a score for each piece of the training data by inputting the training data to the score function,
wherein the score function optimization unit:
sets a weight for a pair with the training data of the positive example to 1, for the training data of the negative example which will be a false positive with respect to a false positive rate that has been set in advance, and sets a weight for a pair with the training data of the positive example to $\lambda$, for the training data of the negative example which will not be a false positive with respect to the false positive rate that has been set in advance; and
updates the parameter of the score function, while decreasing the value of the weight $\lambda$.

3. A trained model generation method performed by a computer for machine learning a score function to be used for two-class classification, the trained model generation method comprising:
calculating a score for each piece of training data by inputting the training data to the score function;
identifying a set of negative example training data that will be a false positive with respect to a specific fixed value of a false positive rate, based on the calculated scores; and
updating a parameter of the score function through machine learning that is performed, so as to maximize the index,
wherein the index is calculated by setting a weight for a pair of a positive example training data and a negative example training data to 1 in a case where the negative example training data is within the identified set, and setting the weight for the pair to $\lambda$, which is a positive real number, in a case where the negative example training data is not within the identified set, wherein the update is performed while decreasing the value of the weight $\lambda$ over a course of the machine learning, wherein the index thereby represents a total value of a value obtained by multiplying an AUC by the weight $\lambda$ and a value obtained by multiplying a pAUC by a weight $(1-\lambda)$, wherein the AUC indicates an area of a region on a horizontal axis side of a curve obtained by changing a threshold for determining a positive example and a negative example in the score function and setting a vertical axis as a true positive rate and a horizontal axis as a false positive rate, and wherein the pAUC is a value of the AUC when the value of the false positive rate is set to a specific fixed value, and indicates an area of a region enclosed by the curve, the horizontal axis, and the vertical axis that passes through the fixed value.

4. The trained model generation method according to claim 3, further comprising:

calculating a score for each piece of the training data by inputting the training data to the score function, wherein the updating of the parameter of the score function comprises:

setting a weight for a pair with the training data of the positive example to 1, for the training data of the negative example which will be a false positive with respect to a false positive rate that has been set in advance, and setting a weight for a pair with the training data of the positive example to $\lambda$, for the training data of the negative example which will not be a false positive with respect to the false positive rate that has been set in advance; and updating the parameter of the score function, while decreasing the value of the weight $\lambda$.

5. A non-transitory computer-readable recording medium that includes a program, recorded thereon, for machine learning a score function to be used for two-class classification, the program including instructions that cause a computer to carry out:

calculating a score for each piece of training data by inputting the training data to the score function;

identifying a set of negative example training data that will be a false positive with respect to a specific fixed value of a false positive rate, based on the calculated scores; and updating a parameter of the score function through machine learning that is performed so as to maximize the index, wherein the index is calculated by setting a weight for a pair of a positive example training data and a negative example training data to 1 when the negative example training data is within the identified set, and setting the weight for the pair to $\lambda$, which is a positive real number, when the negative example training data is not within the identified set, wherein the update is performed while decreasing the value of the weight $\lambda$ over a course of the machine learning, wherein the index thereby represents a total value of a value obtained by multiplying an AUC by the weight $\lambda$ and a value obtained by multiplying a pAUC by a weight $(1-\lambda)$, wherein the AUC indicates an area of a region on a horizontal axis side of a curve obtained by changing a threshold for determining a positive example and a negative example in the score function and setting a vertical axis as a true positive rate and a horizontal axis as a false positive rate, and wherein the pAUC is a value of the AUC in a case where the value of the false positive rate is set to a specific fixed value, and indicates an area of a region enclosed by the curve, the horizontal axis, and the vertical axis that passes through the fixed value.

6. The non-transitory computer-readable recording medium according to claim 5, wherein the program causes the computer to carry out:

calculating a score for each piece of the training data by inputting the training data to the score function; and in the updating the parameter of the score function:

setting a weight for a pair with the training data of the positive example to 1, for the training data of the negative example which will be a false positive with respect to a false positive rate that has been set in advance, and setting a weight for a pair with the training data of the positive example to $\lambda$, for the training data of the negative example which will not be a false positive with respect to the false positive rate that has been set in advance; and updating the parameter of the score function, while decreasing the value of the weight $\lambda$.

* * * * *